US008065280B2

(12) United States Patent
Cox et al.

(10) Patent No.: US 8,065,280 B2
(45) Date of Patent: Nov. 22, 2011

(54) METHOD, SYSTEM AND COMPUTER PROGRAM PRODUCT FOR REAL-TIME DATA INTEGRITY VERIFICATION

(75) Inventors: John S. Cox, Apex, NC (US); Andrew W. Spyker, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 10/738,101

(22) Filed: Dec. 17, 2003

(65) Prior Publication Data

US 2005/0149601 A1 Jul. 7, 2005

(51) Int. Cl.
*G06F 7/00* (2006.01)
*G06F 17/00* (2006.01)

(52) U.S. Cl. .................. 707/690; 707/694; 707/695

(58) Field of Classification Search .................. 707/201, 707/690, 694, 695
See application file for complete search history.

(56) References Cited

U.S. PATENT DOCUMENTS

| | | | | |
|---|---|---|---|---|
| 5,799,322 A | * | 8/1998 | Mosher, Jr. ........................... 1/1 |
| 5,870,759 A | * | 2/1999 | Bauer et al. .................. 707/201 |
| 6,044,398 A | | 3/2000 | Marullo et al. ............... 709/219 |
| 6,253,213 B1 | | 6/2001 | Vanderschaaf .............. 707/203 |
| 6,321,252 B1 | | 11/2001 | Bhola et al. .................. 709/204 |
| 6,542,905 B1 | | 4/2003 | Fogel et al. .................... 707/200 |
| 6,957,227 B2 | * | 10/2005 | Fogel et al. .................... 707/102 |
| 2003/0056173 A1 | | 3/2003 | Copenhaver et al. ......... 715/513 |
| 2003/0149709 A1 | * | 8/2003 | Banks ........................... 707/200 |
| 2004/0010502 A1 | * | 1/2004 | Bomfim et al. ............... 707/100 |

OTHER PUBLICATIONS

Helal et al., "A three-tier architecture for ubiquitous data access," *ACS/IEEE Intl. Conf. on Computer Systems and Applications*, pp. 177-180 (2001).

* cited by examiner

*Primary Examiner* — John R. Cottingham
*Assistant Examiner* — Mariela Reyes
(74) *Attorney, Agent, or Firm* — Patents On Demand, P.A.; Brian K. Buchheit; Scott M. Garrett

(57) ABSTRACT

The present invention is a method and system that provides visual, production level, high-performance, integrated and automatic data integrity verification in a Web-based, e-business or other similar application, using a middleware application server. Asynchronous messaging is utilized to achieve real-time data verification. When data is read and updated by the application running in the application server, a message containing certain aspects of the data is published to a data auditor "queue" in the message server. Publishing the data is an asynchronous and high-performance operation and thus does not significantly slow down the operation being performed by the application server. The message is delivered to the message server and control immediately returns to the application to continue processing. Concurrently, the auditor checks the values resulting from the transaction and determines if the transactions have been recorded accurately.

15 Claims, 3 Drawing Sheets

METHOD, SYSTEM AND COMPUTER PROGRAM PRODUCT FOR REAL-TIME DATA INTEGRITY VERIFICATION

BACKGROUND OF THE INVENTION

1. Field of the Invention

This invention relates to a method, system, and program for automatically monitoring data consistency across a database and, more particularly, to a method for auditing, asynchronously, transactions between application servers and a database server.

2. Description of the Related Art

Computers and the worldwide web are now a major backbone of businesses of all kinds, including traditional "bricks and mortar" businesses as well as web-based or E-businesses. E-commerce sites perform thousands of financial transactions on a daily basis. Banks and other financial institutions have both walk-in customers and customers utilizing electronic transaction methods (computer banking, ATM machines and the like); all of these transactions are executed via computer systems accessing and updating one or more databases via a database server.

Obviously, accuracy is vital to the performance of these -massive numbers of calculations and transactions. A single error can compound into an unlimited number of subsequent errors if it is considered that that single error generates an incorrect number that is then used by all further transactions occurring thereafter. The impact of such errors can be devastating to anyone or any organization relying on the accuracy of the numbers.

It is a significant challenge, in web-based or E-business-based applications developed to run on application server middleware, to ensure and verify application data integrity in the database. In these scenarios, multiple execution threads from one or more application servers may simultaneously read and update the same data. It is common in these scenarios for two or more "execution threads" to attempt to simultaneously read, update and then write back a new value to the same database row. This can result in a subtle, but very serious, silent error, causing application data to be usable, but invalid. This is referred to herein as data corruption.

As an example, consider a banking scenario, where two threads may attempt to update the balance of a user's account simultaneously. This could easily happen in a real-life scenario where a husband and wife each access their bank account via separate ATM machines at about the same time. The following table illustrates the two separate threads. In Table 1 below, data corruption in the form of an incorrect user account balance will occur if Thread 1 and Thread 2 process the account credit method in the alphabetically-ordered sequence. This example assumes an initial user balance of $1,000.

TABLE 1

| Thread 1 | Thread 2 |
| --- | --- |
| a) Account.credit ($200) | d) Account.credit ($100) |
| b) currentBalance = $1,000 (getBalanceFromDB( )) | e) currentBalance = $1,000 (getBalanceFromDB( )) |
| c) newBalance = $1,200 ($1,000 + 200) | f) newBalance = $1,100 ($1,000 + 100) |
| g) updateBalanceInDB ($1,200) | h) updateBalanceInDB ($1,100) |

In this example, the user's account is credited $200 (Thread 1) and $100 (Thread 2). This is equivalent to the husband depositing $200 and the wife depositing $100. Therefore, the ending balance should be $1,300. However, the final update in Statement H leaves the user's balance at $1,100. This may go unnoticed for an extended period of time, obviously, a very serious problem. The reason for this error is simple and inconspicuous; Thread 2 commences accessing the data before Thread 1 has completed the updating step, statement G. Thus, it begins the transaction without taking into consideration the $200 credit of Thread 1. The updating step of Statement H simply overwrites the updating step of Statement G.

Verifying application data integrity is currently a very difficult problem to solve. This is due to several challenges. First, data corruption is a subtle and silent error. That is, data corruption, such as in the example given in Table 1, does not produce an application error of any kind. Data can be corrupted very subtly and is impossible to detect without a serialized account of the transaction execution.

In addition, very small timing windows in relation to the length of transactions can cause data corruption. These timing windows will not generally be encountered in a simple test environment, but will show up in a production, high-concurrency transaction processing environment. These timing windows may be relatively rare and therefore data validation must be able to be enabled easily and for long periods of time without affecting normal application flow and processing.

Data corruption problems have been attempted to be solved, e.g., using leading database software programs, by increasing the default "isolation level" of transactions. Isolation level is a database-specific configuration setting. By increasing the isolation level, transactions can be serialized to guarantee data integrity. That is, each transaction must be completed before the next transaction is commenced. This course grain approach diminishes the number of data errors. However, performance is severely affected, because transactions are serialized and not processed concurrently. Accordingly, this option is rarely chosen except in a test environment.

The second and more common option for solving this problem involves the application (or application server) correctly allocating locks on individual database rows to enforce data integrity. In the scenario of Table 1, if Statements B and E both acquire an "update" lock on the database row for the user's account balance as the row is read, the first thread to reach the statement will be permitted to read the row data. The second thread to execute the statement also attempts to allocate an update lock and will not be permitted to read the row data until the first thread's transaction completes. This provides data integrity and a correct account balance.

This fine grain application locking method provides the best solution for data integrity. However, the key to using the application locking method to achieve data integrity successfully is to minimize row locking to avoid deadlocks and transaction failures, along with the ability to verify data integrity at run time. Thus, locking provides a limited solution, since less locking means less data integrity. In addition, databases do not support update locking in various scenarios such as "join selects", aggregated queries, etc. In these scenarios, it is impossible for the database to ensure data integrity with standard isolation settings.

Another approach is to integrate application level trace code to write out full transaction details in order to detect the problem. This highly intrusive approach can severely slow an application runtime or otherwise change runtime characteristics such that data corruption is not encountered. This type of tracing is not generally acceptable to a production environment.

Accordingly, there is a need for technology that provides production level, high performance, integrated, "real-time" and automatic/visual data integrity verification.

SUMMARY OF THE INVENTION

The present invention is a method and system that provides visual, production level, high-performance, integrated and automatic data integrity verification in a Web-based, e-business or other similar application, using a middleware application server. Asynchronous messaging is utilized to achieve real-time data integrity verification. When data is read and updated by the application running in the application server, a message containing certain aspects of the data is published to a data auditor "queue" (for a point-to-point configuration) or "topic" (for a pub/sub configuration) in the message server. As the invention could be accomplished with the use of either a queue or topic, from this point forward this will be referred to as a "queue". Publishing the data is an asynchronous and high-performance operation and with minimal performance impact on the operation being performed by the application server. The message is delivered to the message server and control immediately returns to the application to continue processing. Concurrently, the auditor checks the values resulting from the transaction and determines if the transactions have been recorded accurately.

DETAILED DESCRIPTION OF THE PREFERRED EMBODIMENTS

Figure 1:
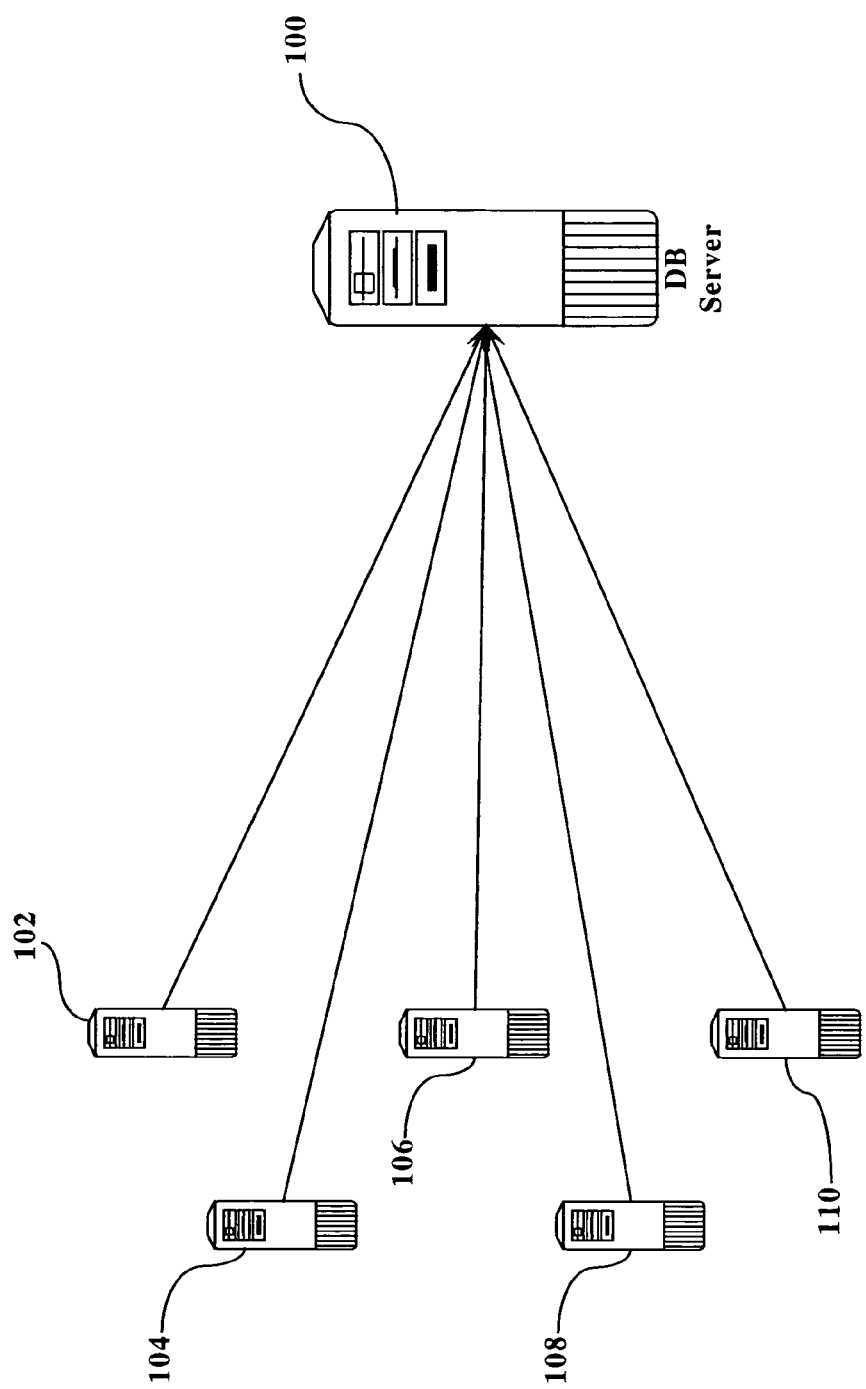
FIG. 1 illustrates the general topology of the prior art.

FIG. 1 illustrates the general topology of the prior art. As seen in figure one, a database server 100 is connected to one or more application servers 102, 104, 106, 108, and 110. Each of the application servers interacts with the database server 100, typically in a series of read operations, write operations, and updating operations. In a typical scenario, e.g., in a financial operation, application server 102 would read from the database server 100, modify its local copy, and then update the data in database server 100. This read, modify, and update operation is referred to herein as a "thread".

Each of the application servers performs these trends on a regular basis, often simultaneously. The speed with which these transactions occur can cause data corruption as described above. This corruption can be caused by multiple threads attempting to modify the same set of data from a single server (e.g., even if there is only a single application server interacting with database server 100), or by two or more of the servers attempting to modify the same set of data at one time. The corruption of the data can go unnoticed for a long time, causing potential problems for anyone who relies on accuracy of the data.

Figure 2:
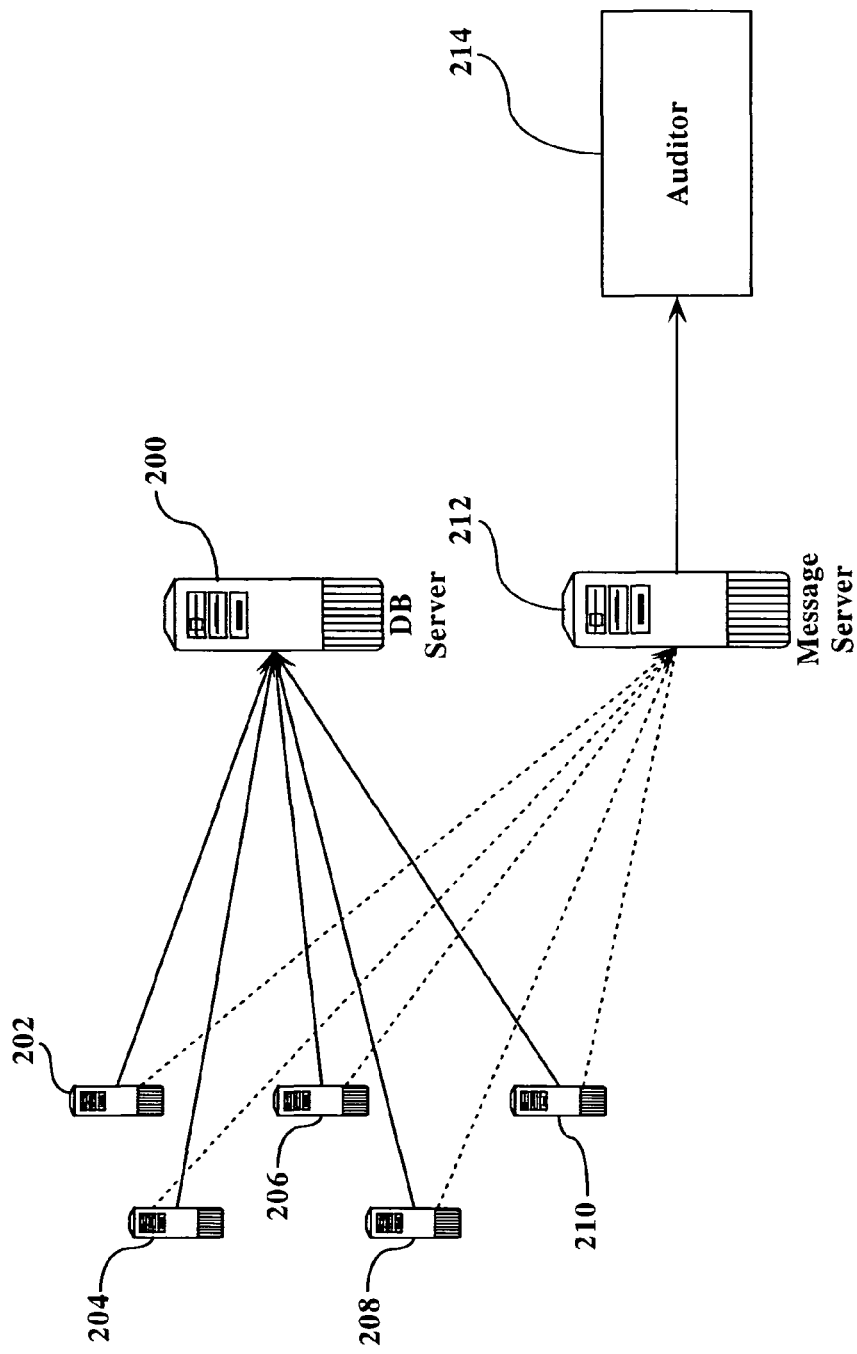
FIG. 2 illustrates the general topology of the present invention.

FIG. 2 illustrates the general topology of the present invention. Referring to FIG. 2, one or more application servers 202, 204, 206, 208, and 210 connect to database server 200 in a manner similar to the application server/database server connections illustrated in FIG. 1. In addition, however, in accordance with the present invention, the application servers communicate with a message server 212. Message server 212, in turn, communicates with auditor 214. While FIG. 2 illustrates message server 212 as a separate element with respect to application servers 202-210, it is understood that message server 212 could also be embedded in the application server, or be provided as a service in the application servers dedicated to performing the functions of message server 212.

Using asynchronous messaging technology, message server 212 establishes an asynchronous relationship with application servers 202 to 210 in a well known manner. In accordance with the present invention, when data is read and updated by any of the applications running on application servers, a message is published to a queue (e.g., "data auditor queue") via the message server 212, and a data update alert is issued which will be delivered to the auditor. As noted above, publishing the data by the application running on the application servers is an asynchronous and high-performance operation. In the context of the present invention, the term "asynchronous" refers to the fact that the application does not stop and wait for the message to be delivered to the queue subscriber application (message server). The message is delivered to the message server 212 and control is immediately returned to the application to continue processing.

The message published in this example contains three data points. First, the message published contains the original value of the row data read by the application thread when the transaction began. Second, the message published contains the change in value (d) applied by the application thread. Finally, the message published contains the final value read when the transaction update completes.

The auditor subscribes to the data auditor queue, receiving each data update alert asynchronously. The auditor can be a simple processor configured to use the data published in the auditor queue to compute expected and actual values of the application data. If data becomes corrupted, as in the example given above, the auditor automatically detects the corruption. Data corruption can be shown visually by the auditor through a GUI client during testing. In production, the auditor can be enabled to provide automated alerts if data corruption occurs. Numerous other methods of providing alerts will be clear to one of ordinary skill in the art.

Figure 3:
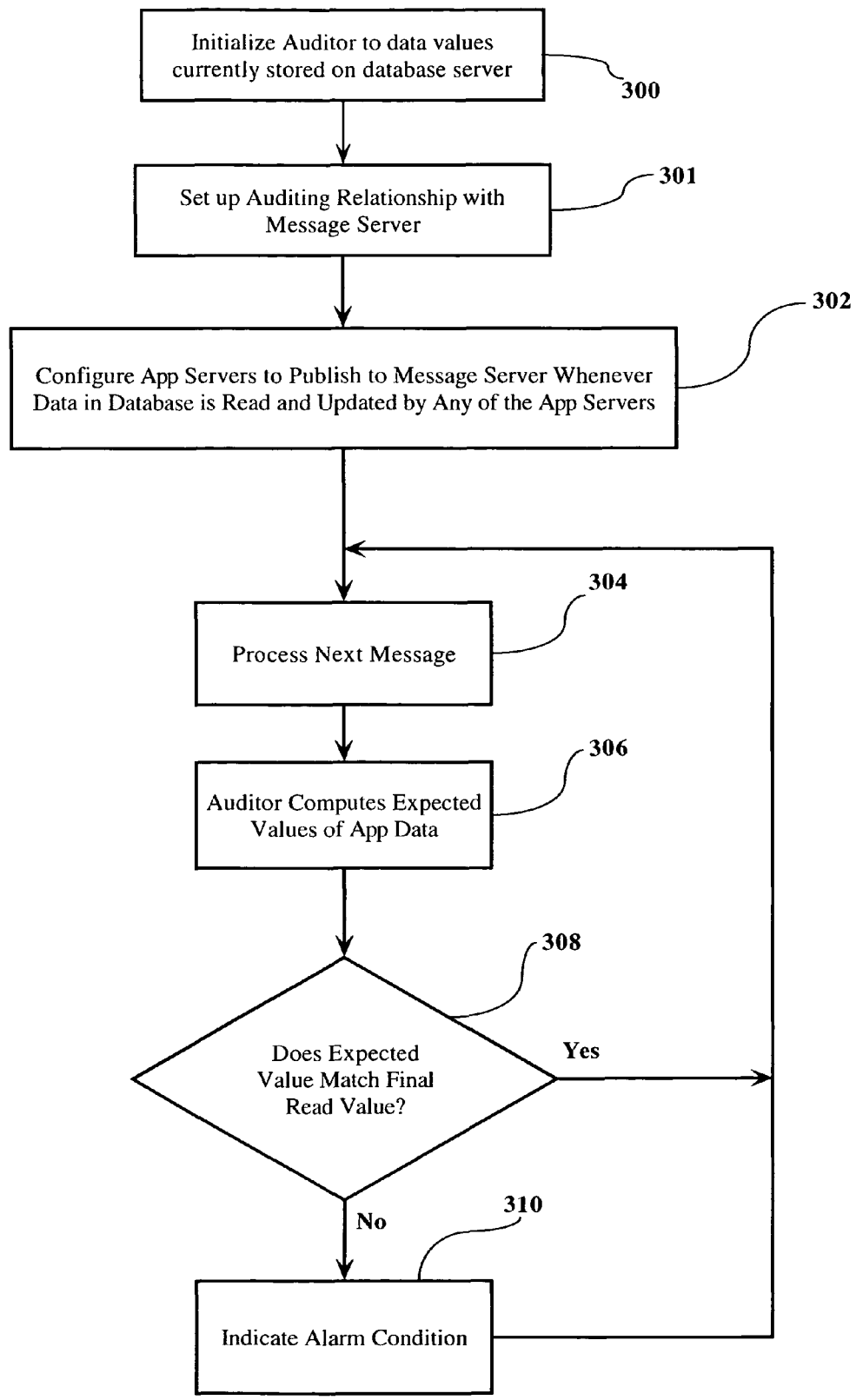
FIG. 3 is a flow chart illustrating an example of steps performed in accordance with the present invention.

FIG. 3 is a flow chart illustrating an example of steps performed in accordance with the present invention. At step 300, the initial known value of the data is obtained and from this value all further calculations are performed. At step 301, the auditing relationship between the auditor and the message server is set up. At step 302, the application servers are configured to publish to the message server whenever data in the database is read and updated by any of the application servers. At step 304, the next message is processed, and at step 306 the auditor computes the expected values of the application data.

At step 308, a determination is made as to whether or not the expected value matches the final read value. If the expected value does match the final read value, the process proceeds back to step 304 to process the next message. If, however, the expected value does not match the final read value, at step 310 an alarm condition is indicated, and the appropriate alarm is presented to the user. The process than proceeds back to step 304 to continue monitoring by processing the next message.

Middleware application server products provide various programming models for applications to access and update database data. The automated data verification auditor of the present invention can be implemented as an integrated service using, for example, the standards-based J2EE 1.3 application programming model; however, the present invention is not limited to this specific programming model and any other programming languages can be used to accomplish the present invention. J2EE 1.3 including EJB 2.0 provides the necessary foundation for the data verification auditor to be implemented as an automated, production-ready, high performance service which can be enabled dynamically during application testing or in production. EJB 2.0 provides an object model for database read and update operations. The EJB database persistence model uses a read, set, and update mechanism for database operations. The life cycle for an entity EJB which represents a row in the application database includes the following methods implemented by the application server:

| | |
|---|---|
| ejbLoad( ) | // Load the current value from the database row |
| getXXX( ), setXXX( ) | // Abstract methods to read/update Entity data |
| ejbStore( ) | // Update the database row data with the current values in the Entity object |

Messages published to the auditor must include the original value of the database row data, the change in values produced through application processing, and the final value in the database when the transaction is completed. The ejbLoad( ), abstract setXXX( ), and ejbStore( ) methods of the EJB programming model inherently provide these values.

An application server implementing the data auditor service can simply track these values as the EJB methods are invoked and publish them after ejbStore( ). The application server implements the EJB 2.0 lifecycle methods detailed herein and therefore no user application code modifications are necessary. The application can be written to the current EJB 2.0 programming model specification. The application server can provide a dynamic configuration switch to enable and disable data auditor message publishing. Also, J2EE 1.3 mandates the availability of JMS messaging, providing the needed mechanism for message publish and subscribe to the data auditor application.

The configuration of the present invention provides numerous advantages. The auditor solves the difficult problem of application data verification in a distributed environment where concurrent reads and updates to database row data occur for multiple execution threads. The auditor also provides a service-based data verification mechanism for web and e-business based applications, leveraging a middleware application server. There is no disruption in the normal flow of application processing and therefore it can be run in "benchmark" and production scenarios to catch even rare and subtle data corruption windows. The auditor client application can be run on a dedicated client node, separated from benchmark or production systems. This allows applications to proceed at full performance. Further, it supports applications running in various topologies, including single node, split-tier, and clustered applications. In addition, it is not database-specific and can run successfully with all major database software programs.

The auditor can also provide visual notification of data corruption or automated alerts in "real-time" as the application runs. The auditor and the publishing of data audit messages can be enabled and disabled dynamically. Further, the auditor as described is built on J2EE 1.3 (EJB and JMS) technology so it is portable to any application server implementing this and future J2EE specifications.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of an application server, message server, and/or database server. In a client/server environment, such software programming code may be stored with storage associated with a server. The software programming code may be a computer program product embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. A method for asynchronously monitoring data accuracy in a database storing transaction data pertaining to transactions processed by one or more application servers, comprising the steps of:

establishing an asynchronous messaging relationship between each of said one or more application servers and a message server;

for each transaction processed by each of said one or more application servers, receiving at said message server from each application server processing transactions with the database, asynchronously with and prior to the completion of the processing of said transaction, a message containing initial and updated data parameters pertinent to each transaction, the initial data parameter being a value initially read from the database and the updated data parameter being a value written to the database as a result of the transaction;

each application server publishing the message containing the initial and updated data parameters, including data points corresponding to said initial and updated data parameters to the message server;

issuing to an auditor, by said message server, a data update alert indicating the publishing of said message;

providing said published messages to said auditor, said auditor determining an expected value and an actual value resulting from each transaction based on the initial and updated data parameters for each transaction and asynchronously verifying the accuracy of results of said transactions based on the actual and expected values; and indicating an alarm condition when the results are not accurate.

2. The method of claim 1, wherein said transaction data pertains to a row of data stored in said database server, and wherein said data points comprise at least:

a value of said row data before the transaction;

a change to said row data resulting from said transaction; and a value of said row data after said transaction.

3. The method of claim 2, wherein said auditor verifies the accuracy of the results of said transaction upon receipt of said data update alert.

4. The method of claim 1, wherein said asynchronous messaging relationship comprises a point-to-point relationship.

5. The method of claim 1, wherein said asynchronous messaging relationship comprises a pub/sub relationship.

6. A processor-implemented system for asynchronously monitoring data consistency accuracy in a database storing transaction data pertaining to transactions processed by one or more application servers, comprising a processor configured with:

means for receiving at a message server, from each of said one or more application servers processing transactions with the database, asynchronously with and prior to the completion of the processing of said transaction, a message containing initial and updated data parameters pertinent to each transaction, the initial data parameter being a value initially read from the database and the updated data parameter being a value written to the database as a result of the transaction, for each transaction processed by each application server;

means, in each application server, for publishing said message containing said initial and updated data parameters to the message server;

means for issuing to an auditor, by said message server, a data update alert indicating the publishing of said message;

means for providing said published messages to an auditor, said auditor determining an expected value and an actual value resulting from each transaction based on the initial and updated data parameters and asynchronously verifying the accuracy of results of said transactions based on the actual and expected values; and means for indicating an alarm condition when the results are not accurate.

7. The system of claim 6, wherein said transaction data pertains to a row of data stored in said database server, and wherein said data points comprise at least:

a value of said row data before the transaction;

a change to said row data resulting from said transaction; and a value of said row data after said transaction.

8. The system of claim 7, wherein said auditor verifies the accuracy of the results of said transaction upon receipt of said data update alert.

9. The system of claim 6, wherein said asynchronous messaging relationship comprises a point-to-point relationship.

10. The system of claim 6, wherein said asynchronous messaging relationship comprises a pub/sub relationship.

11. A computer program product for asynchronously monitoring data consistency accuracy in a database storing transaction data pertaining to transactions processed by one or more application servers, the computer program product comprising a computer-readable storage medium having computer-readable program code embodied in the medium, the computer-readable program code comprising:

computer-readable program code that establishes an asynchronous messaging relationship between each of said one or more application servers and a message server computer-readable program code that, for each transaction processed by each of said one or more application servers, receives at said message server, from each application server processing transactions with the database, asynchronously with and prior to the completion of the processing of said transaction, a message containing initial and updated data parameters pertinent to each transaction, the initial data parameter being a value initially read from the database and the updated data parameter being a value written to the database as a result of the transaction;

computer-readable program code that causes each application server to publish the message containing the initial and updated data parameters, including data points corresponding to said initial and updated data parameters to the message server;

computer-readable program code that causes said message server to issue a data update alert to an auditor, the data update indicating the publishing of said message;

computer-readable program code that provides said published messages to said auditor, said auditor determining an expected value and an actual value resulting from each transaction based on the initial and updated data parameters and asynchronously verifying the accuracy of results of said transactions based on the actual and expected values; and computer-readable program code that indicates an alarm condition when the results are not accurate.

12. The computer program product of claim 11, wherein said transaction data pertains to a row of data stored in said database server, and wherein said data points comprise at least:

a value of said row data before the transaction;

a change to said row data resulting from said transaction; and a value of said row data after said transaction.

13. The computer program product of claim 12, wherein said auditor verifies the accuracy of the results of said transaction upon receipt of said data update alert.

14. The computer program product of claim 11, wherein said asynchronous messaging relationship comprises a point-to-point relationship.

15. The computer program product of claim 11, wherein said asynchronous messaging relationship comprises a pub/sub relationship.

* * * * *